B. GIGER.
Corn-Plow.
No. 8,170.  Patented June 24, 1851.
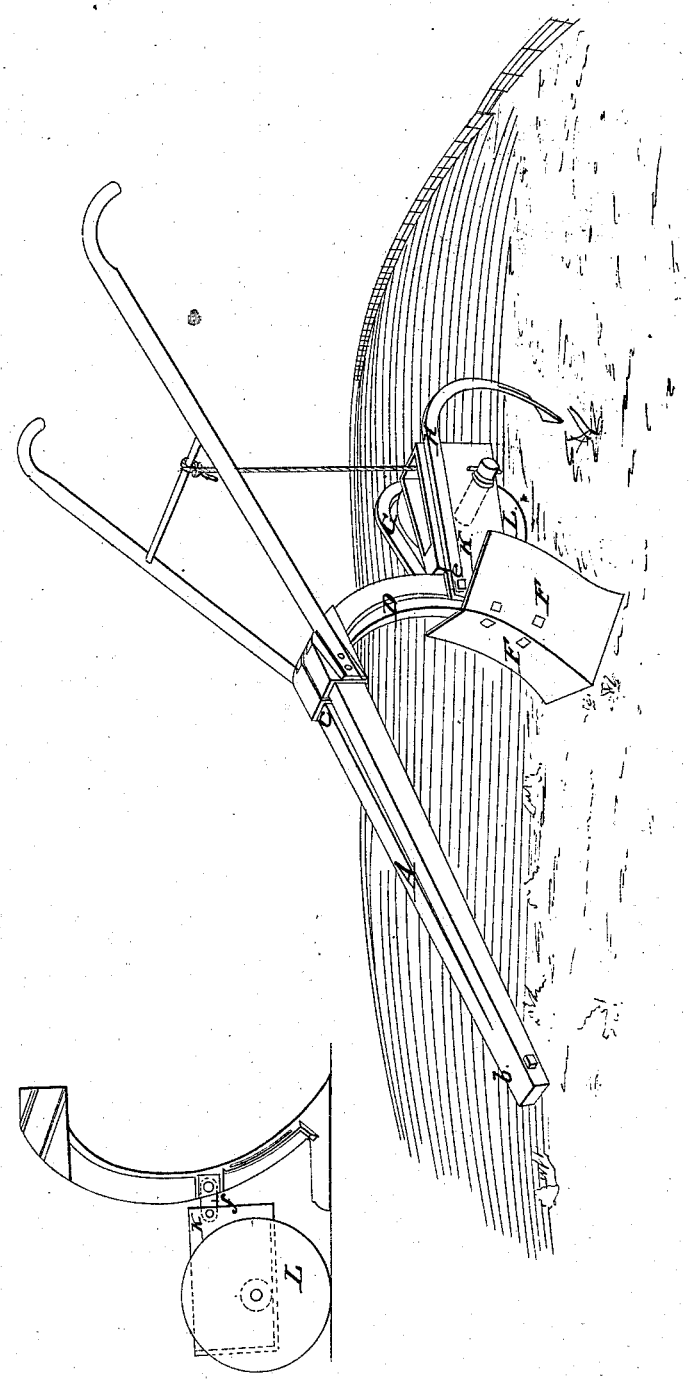

UNITED STATES PATENT OFFICE.

JOHN COOPER, ADMINISTRATOR OF BENJ. GIGER, DECEASED, OF SPRINGFIELD, ILLINOIS.

IMPROVEMENT IN PLOWS.

Specification forming part of Letters Patent No. 8,170, dated June 24, 1851.

*To all whom it may concern:*

Be it known that BENJAMIN GIGER, of the county of Sangamon, State of Illinois, did invent a new and useful machine for breaking the soil for corn and for planting and cultivating the same; and I do hereby declare that the following is a full and exact description thereof.

The machine in its general form resembles a plow; and it consists of a double beam, A, united at the end $b$ by a screw and inserted at the end $c$ into sockets at the upper extremity of the double standard D. Said double standard is designed to be composed of cast-iron, and is somewhat curved in its form, not only having sockets for the double beam, but also sockets for the handles at its upper extremity.

At the lower part of the double standard project two flanges to the right and left, with a long mortise in each, to which flanges the shares F F are designed to be attached by screws, so as readily to be taken off, or to be moved downward as the edges wear off or necessity may require. The particular use of the flanges is to render a firm support to the shares and to obviate the necessity of using the framework behind, as in common plows, and to leave room for the planting apparatus.

There will be no mold-board separate from the shares, but the shares are designed to be composed of wrought-iron, and are rhomboidal in their shape, as shown in the drawing. When fastened upon the flanges the central part will project forward, where they unite, and their extreme edges will incline backward. Just above said flanges, at the point $e$, project backward two coverers, G and H, the hinder extremities of which curve downward to the earth in the shape of a hook. They are to be composed of wrought-iron, and are designed to cover the corn with the earth as the plow progresses. The ends of said coverers at the point $e$ are fastened to the standard by a screw-bolt, which also passes through a short link-bar, $f$, that is inserted between the two standards, plays freely on the said screw-bolt, and gives support to the dropping-box K. The box K is placed between the coverers, and through its lower part passes the axle of the wheel L.

In the lower part of the box, directly under the axle, is a small opening, and in the axle is also a small hole which will hold from three to five grains of corn, and as the wheel revolves and the hole in the axle comes to the opening in the box the corn which is deposited in the axle will fall to the ground, to be immediately covered by the action of the coverers G and H. After the planting of corn is over said machine may be taken to pieces, and by fastening handles to a single beam and standard two single plows may be constructed to be used for other purposes.

What is claimed as the invention of BENJAMIN GIGER, and as not previously known, is—

The peculiar form and construction of the standard, with its sockets at the upper extremity and flanges at the lower, and the method of uniting them so as to form a double machine, capable also of being used for cultivation in its separate parts, as set forth.

The whole machine, as above described, constitutes "Giger's Corn-Planter."

JOHN COOPER,
*Administrator of the Estate of Benjamin Giger, deceased.*

Witnesses:
JAS. C. CONKLING,
JOSEPH E. MCCOY,
B. F. CHEW.